(12) United States Patent
Sugaya et al.

(10) Patent No.: US 6,780,893 B2
(45) Date of Patent: Aug. 24, 2004

(54) ANION EXCHANGER AND PROCESS FOR PRODUCING ANION EXCHANGE MEMBRANE

(75) Inventors: Yoshio Sugaya, Yokohama (JP); Hisao Kawazoe, Yokohama (JP)

(73) Assignees: Asahi Glass Engineering Co., Ltd., Chiba (JP); Asahi Glass Company, Limited, Tokyo (JP)

( * ) Notice: Subject to any disclaimer, the term of this patent is extended or adjusted under 35 U.S.C. 154(b) by 18 days.

(21) Appl. No.: 10/207,147

(22) Filed: Jul. 30, 2002

(65) Prior Publication Data

US 2003/0105173 A1 Jun. 5, 2003

(30) Foreign Application Priority Data

Jul. 30, 2001 (JP) ......................................... 2001-229670
Aug. 28, 2001 (JP) ......................................... 2001-257789

(51) Int. Cl.[7] .................................................. C08J 5/22
(52) U.S. Cl. ............................. 521/27; 521/30; 525/534
(58) Field of Search ........................... 525/534; 521/27, 521/30

(56) References Cited

U.S. PATENT DOCUMENTS

| | | | |
|---|---|---|---|
| 5,180,750 A | | 1/1993 | Sugaya et al. |
| 6,277,512 B1 | * | 8/2001 | Hamrock et al. ............ 429/33 |
| 6,590,067 B2 | * | 7/2003 | Kerres et al. ............... 528/391 |

FOREIGN PATENT DOCUMENTS

| | | |
|---|---|---|
| EP | 0 352 798 | 1/1990 |
| GB | 2 086 954 | 5/1982 |
| WO | WO 00/09588 | 2/2000 |
| WO | WO 01/58576 | 8/2001 |

OTHER PUBLICATIONS

Patent Abstracts of Japan, JP 9–227698, Sep. 2, 1997.
Patent Abstracts of Japan, JP 2–294338, Dec. 5, 1990.
Patent Abstracts of Japan, JP 2–269745, Nov. 5, 1990.

* cited by examiner

*Primary Examiner*—Fred Teskin
(74) *Attorney, Agent, or Firm*—Oblon, Spivak, McClelland, Maier & Neustadt, P.C.

(57) ABSTRACT

A process for producing an anion exchange membrane, which comprises mixing from 25 to 95 mass % of a polymer having anion exchange groups or active groups convertible to anion exchange groups (hereinafter referred to as polymer 1), and from 5 to 75 mass % of a polymer having no anion exchange groups or no active groups convertible to anion exchange groups (hereinafter referred to as polymer 2), and forming the obtained composition into a membrane, said process including a step of cross-linking an aromatic ring of a repeating unit constituting polymer 1 with an aromatic ring of another repeating unit constituting polymer 1 or with a cross-linkable site of polymer 2, and in a case where polymer 1 is a polymer having active groups convertible to anion exchange groups, a step of converting the active groups to anion exchange groups.

24 Claims, No Drawings

ANION EXCHANGER AND PROCESS FOR PRODUCING ANION EXCHANGE MEMBRANE

The present invention relates to a process for producing an anion exchange membrane, particularly to a process for producing an anion exchange membrane which is useful for diffusion dialysis, electrodialysis or electrolysis and which can be used as a diaphragm for batteries. Further, the present invention relates to an anion exchanger constituting such an ion exchange membrane.

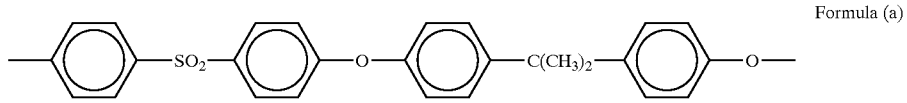

Formula (a)

As a practical useful anion exchanger, an anion exchanger obtained by amination of a copolymer of chloromethylated styrene with divinyl benzene, or an anion exchanger obtained by quaternary pyridinium-modification of a copolymer of vinyl pyridine with divinyl benzene, is available. Such an anion exchanger is excellent in the chemical resistance, heat resistance and ion exchange performance, and the ion exchange characteristics or selective permeability can be controlled by changing the content of divinyl benzene serving as a cross-linking agent. Accordingly, it has been used for various applications, and various products have been synthesized.

In new applications including e.g. efficient recovery of an acid having a high oxidation ability such as hydrofluoric acid or nitric acid, recovery of an acid containing an oxidative metal, recovery of phosphoric acid from an etching waste liquid in aluminum industry, concentration of sea water to produce inexpensive sodium chloride comparable to industrial salt, and electrolysis of an aqueous solution containing electrolytes or organic substances, ion exchange membranes are required to have low electric resistance, low permeability of water and corrosion resistance.

However, conventional ion exchange membranes made of divinyl benzene type copolymers, have had a problem that they cannot satisfy the above requirements. Namely, in order to lower the electric resistance, it is necessary to increase the ion exchange capacity and to increase the water content, but if the content of chloromethylated styrene or divinyl benzene is increased, and the content of divinyl benzene serving as a cross-linking agent, is reduced, for that purpose, not only the mechanical strength of the resulting ion exchange membrane decreases, but also the selective permeability and corrosion resistance will decrease, and permeability of water will increase. As another method for reducing the electric resistance, a method of reducing the membrane thickness is conceivable. However, with an ion exchange membrane made of a styrene/divinyl benzene copolymer, it is difficult to reduce the thickness to a level of not more than 100 $\mu$m, in view of its mechanical strength, particularly in view of its brittleness.

On the other hand, for separation membranes such as ultrafiltration membranes, reverse osmosis membranes or gas separation membranes, materials of engineering plastic type excellent in mechanical strength and processability are used. Particularly for a membrane made of a polysulfone type polymer excellent in chemical resistance, one having ion exchange groups introduced, is used for improving the permeability of ultrafiltration membranes or reverse osmosis membranes, and one having ion selective permeability imparted has been studied for application to ion exchange membranes. For example, an anion exchange membrane synthesized from a chloromethylated product of a polysulfone having a repeating unit of the formula (a), is disclosed in J. Membrane Science, 22 (1985), 325–332. However, the ion exchange membrane made of such a polysulfone type polymer has had a problem such that if the ion exchange capacity is increased to lower the electric resistance, the ion selective permeability, the mechanical strength and the durability tend to deteriorate.

Further, an anion exchange membrane prepared from a mixture of a polysulfone having a repeating unit of the formula (a) and its bromomethylated product, is disclosed in "Fibers and Industry" vol. 44, No. 1, p. 11 (1988). This membrane was effective to control the ion exchange capacity at a constant level, but, from the practical viewpoint, it was not qualified as a substitute for a conventional anion exchange membrane made of a styrene/divinyl benzene type copolymer.

As a method to solve the above problems, it has been proposed to use a block copolymer of a polysulfone type and to introduce ion exchange groups thereto in a block structure to obtain an ion exchanger (JP-A-2-211257), and a practical anion exchange membrane employing such an anion exchanger has been proposed (JP-A-2-265929, JP-A-2-269745). Further, an anion exchanger having a crosslinked structure obtained by reacting a chloromethylated product of a polysulfone type polymer with a polyamine, has been proposed (JP-A-2-68146), and an anion exchange membrane having such a crosslinked structure and being excellent in the corrosion resistance has been proposed (JP-A-6-80799, JP-A-6-172559, JP-A-6-271688).

These anion exchange membranes have excellent ion selective permeability and chemical resistance, and they are now useful for applications in which conventional anion exchange membranes made of styrene/divinyl benzene copolymer could not be used. However, their durability is still not adequate in applications to recover acids or alkalis from solutions containing highly oxidative acids such as permanganic acid, peroxyvanadic acid, etc., or highly concentrated alkalis. Accordingly, an anion exchange membrane having higher durability, has been desired. Further, since specific copolymers having ion exchange groups and crosslinked structures introduced in block structures, there has been a problem that their production costs are high, and they cannot be provided as inexpensive products.

It is an object of the present invention to provide a process for producing an anion exchange membrane which has a high ion selective permeability and is excellent in durability in a highly oxidative aqueous solution, and which can be produced at low costs.

In a first aspect, the present invention provides a process for producing an anion exchange membrane, which comprises mixing from 25 to 95 mass % of a polymer having anion exchange groups or active groups convertible to anion exchange groups (hereinafter referred to as polymer 1), and from 5 to 75 mass % of a polymer having no anion exchange groups or no active groups convertible to anion exchange groups (hereinafter referred to as polymer 2), and forming the obtained composition into a membrane, said process including a step of cross-linking an aromatic ring of a repeating unit constituting polymer 1 with an aromatic ring of another repeating unit constituting polymer 1 or with a cross-linkable site of polymer 2, and in a case where polymer 1 is a polymer having active groups convertible to anion exchange groups, a step of converting the active groups to anion exchange groups.

The anion exchange membrane obtained by the process of the present invention is made of a mixture comprising polymer 1 which selectively permeate ions, and polymer 2 which does not permeate ions. It is believed that polymers 1 and 2 are uniformly mixed, and an aromatic ring of a repeating unit constituting polymer 1 is crosslinked with an aromatic ring of another repeating unit constituting polymer 1, or with a cross-linkable site of polymer 2, whereby a uniform mixed state can be maintained stably, and high ion selective permeability and high durability will be developed. Here, if polymer 2 is an aromatic hydrocarbon compound, the aromatic ring will be a cross-linkable site (i.e. hydrogen bonded to the aromatic ring will be substituted).

Further, the anion exchange membrane obtained by the present invention is one having polymers 1 and 2 mixed. Accordingly, as compared with conventional membranes made of copolymers, types of polymers to be employed, are many, and it can be produced at a low costs.

Further, in a second aspect, the present invention provides an anion exchanger made of a polymer having haloalkyl groups in an aromatic polysulfone polymer having a repeating unit represented by the formula 4, reacted with an amine:

Formula 4

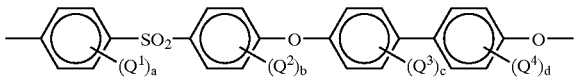

where in the formula 4, $Q^1$, $Q^2$, a and b are as defined in the formula 1, each of $Q^3$ and $Q^4$ which are the same as or different from each other, is a $C_{1-8}$ hydrocarbon group or a fluorine atom, each of c and d is an integer of from 0 to 4, provided that c+d is from 0 to 7, and at least one hydrogen atom bonded to a phenylene group to which $Q^3$ or $Q^4$ can be bonded, is substituted by a haloalkyl group.

With respect to an anion exchanger having anion exchange groups introduced to an aromatic polysulfone polymer, the present inventors have found that the anion exchanger of the present invention made of the above-mentioned aromatic polysulfone polymer having anion exchange groups introduced to biphenyl rings, has far superior ion selectivity and durability to a conventional anion exchanger made of a polymer containing a group other than a single bond between a benzene ring and a benzene ring (for example, an aromatic polysulfone polymer having anion exchange groups introduced to phenyl rings of a bisphenyl propane), which used to be mainly employed.

Further, this anion exchanger is very effective in that it exhibits excellent ion selectivity and durability also in a case where it is used as polymer 1 in the process for production of the above anion exchange membrane.

Now, the present invention will be described in detail with reference to the preferred embodiments.

Firstly, preferred embodiments of the first aspect of the present invention will be described.

In the process of the present invention, from 25 to 95 mass % of polymer 1 and from 5 to 75 mass % of polymer 2 are mixed. If polymer 1 is less than 25 mass %, the ion selective permeability will be low, and if it exceeds 95 mass %, the mechanical properties or durability tends to be inadequate. It is particularly preferred to mix from 40 to 90 mass % of polymer 1 and from 10 to 60 mass % of polymer 2, and it is more preferred to mix from 50 to 80 mass % of polymer 1 and from 20 to 50 mass % of polymer 2.

It is necessary to uniformly mix polymer 1 and polymer 2, and accordingly, those having good compatibility should be used. For example, the combination of polymer 1 and polymer 2 may be a combination of a haloalkylated styrene copolymer and a styrene copolymer which is not haloalkylated, a combination of a haloalkylated styrene copolymer and a vinyl chloride type polymer, a combination of vinyl pyridine type copolymer and a styrene type copolymer, a combination of a vinyl pyridine type copolymer and a vinyl chloride type polymer, a combination of a vinyl imidazole type copolymer and a styrene type copolymer, a combination of vinyl aniline copolymer and a styrene type copolymer, or a combination of a haloalkylated polysulfone type polymer and a polysulfone type polymer which is not haloalkylated.

Polymer 1 is preferably a polymer wherein the main chain has a structural unit having an aromatic ring and a connecting group bonded to each other, and at least one hydrogen atom in the aromatic ring of the main chain is substituted by an anion exchange group or by an active group convertible to an anion exchange group, from the viewpoint of the excellent heat resistance, mechanical strength and chemical resistance. The connecting group may, for example, be as follows:

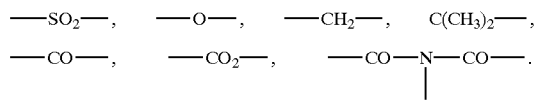

Such a polymer may be a polysulfone type polymer, a polyphenylene oxide type polymer, a polyallylate type polymer, a polyether ketone type polymer or a polyimide type polymer. Among them, the polysulfone type polymer is particularly preferred since ion exchange groups can easily be introduced, and it is excellent in chemical resistance.

As such a polysulfone type polymer, a polymer having a repeating unit represented by the formula 1 is particularly preferred. When a polymer having a repeating unit represented by the formula 1 is used as polymer 1, it is preferred to employ a polymer represented by the formula 2 as polymer 2, from the viewpoint of the compatibility, mechanical properties and chemical resistance.

Formula 1

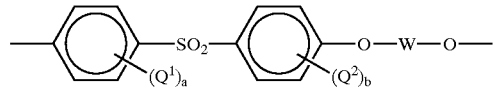

Formula 2

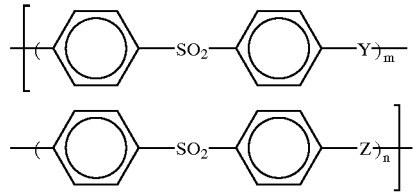

In the formula 1, W is Ph, Ph-Ph or Ph-C(CH$_3$)$_2$-Ph, Ph is a phenylene group, provided that at least one hydrogen atom bonded to an aromatic ring in W is substituted by —$(CH_2)_sX$ (wherein s is an integer of from 1 to 5, and X is Cl, Br, I, a hydroxyl group or —$NR^1R^2$). Here, each of $R^1$ and $R^2$ which are the same as or different from each other, is a hydrogen atom, a $C_{1-5}$ alkyl group or a $C_{1-5}$ hydroxyalkyl group, each of $Q^1$ and $Q^2$ which are the same as or different from each other, is a C1-8 hydrocarbon group or a fluorine atom, and each of a and b is an integer of from 0 to 4, provided that a+b is from 0 to 8.

Further, in the formula 1, a part of X may be substituted by —$NR^3R^4R^{5+}A^-$, wherein each of $R^3$ to $R^5$ which are the same as or different from one another, is hydrogen atom, a $C_{1-5}$ alkyl group or a $C_{1-5}$ hydroxyalkyl group, and A is an anion.

In the formula 2, each of Y and Z which are different from each other, is O, O-Ph-O, O-Ph-Ph-O, O-Ph-$(CH_3)_2$-Ph-O or S, Ph is a phenylene group, m is from 10 to 100, and n is from 0 to 100.

As polymer 1, a polymer having a repeating unit represented by the formula 1 wherein X is Cl, Br, I or a hydroxyl group, is preferably employed, since the reactivity at the time of the subsequent cross-linking reaction, is good. Especially one wherein X is Cl, Br or I, i.e. polymer 1 having a repeating unit represented by the formula 1, having a haloalkyl group introduced into an aromatic ring, is particularly preferred, since it is excellent in the reactivity in this cross-linking reaction. Specifically, haloalkylated products of polymers having the following repeating units, are preferred.

(1) -Ph-$SO_2$-Ph-O-Ph-O—,
(2) -Ph-$SO_2$-Ph-O-Ph-Ph-O—,
(3) -Ph-$SO_2$-Ph-O-Ph-C$(CH_3)_2$-Ph-O—,
(4) -(Ph-$SO_2$-Ph-O-Ph-Ph-O)-(Ph-$SO_2$-Ph-S)—,
(5) -(Ph-$SO_2$-Ph-O-Ph-Ph-O)-(Ph-$SO_2$-Ph-O)—,
(6) -(Ph-$SO_2$-Ph-O-Ph-C$(CH_3)_2$-Ph-O)-(Ph-$SO_2$-Ph-S)—,
(7) -(Ph-$SO_2$-Ph-O-Ph-C$(CH_3)_2$-Ph-O)-(Ph-$SO_2$-Ph-O)—.

Further, it is preferred to mix polymers represented by the following formulae (8) to (16), as polymers 2, to haloalkylated polymers 1 having repeating units of the formulae (1) to (7). The combination of such polymers 1 and 2, may be optionally selected.

(8) -(Ph-$SO_2$-Ph-O)$_m$—,
(9) -(Ph-$SO_2$-Ph-S)$_m$—,
(10) -(Ph-$SO_2$-Ph-O-Ph-O)$_m$—,
(11) -(Ph-$SO_2$-Ph-O-Ph-Ph-O)$_m$—,
(12) -(Ph-$SO_2$-Ph-O-Ph-C $(CH_3)_2$—O)$_m$—,
(13) -(Ph-$SO_2$-Ph-O-Ph-Ph-O)$_m$-(Ph-$SO_2$-Ph-S)$_n$—,
(14) -(Ph-$SO_2$-Ph-O-Ph-Ph-O)$_m$-(Ph-$SO_2$-Ph-O)$_n$—,
(15) -(Ph-$SO_2$-Ph-O-Ph-C$(CH_3)_2$-Ph-O)$_n$-(Ph-$SO_2$-Ph-S)$_n$—,
(16) -(Ph-$SO_2$-Ph-O-Ph-C$(CH_3)_2$-Ph-O)$_m$-(Ph-$SO_2$-Ph-O)$_n$—.

Particularly preferred is a case wherein polymer 1 has a repeating unit represented by (2), wherein X is Cl, and polymer 2 is a polymer represented by (8), since the raw materials are readily available, and it is possible to produce a membrane excellent in ion selective permeability and durability at a low cost. Here, a part of X may be substituted by —$NR^3R^4R^{5+}A^-$. Specifically, it may be so substituted within a range of at most 90 mol %.

Further, from the viewpoint of improvement of the ion selectivity and durability, it is preferred to employ, as polymer 1, an anion exchanger made of a polymer having haloalkyl groups in an aromatic polysulfone polymer having a repeating unit represented by the formula 4, reacted with an amine.

In a case where polymer 1 has a repeating unit represented by the formula 1, wherein X is Cl, Br or I, as mentioned above, the content of the —$(CH_2)_sX$ group in the mixture of polymer 1 and polymer 2, is preferably from 1.0 to 4.0 mmol/g. If the content of the —$(CH_2)_sX$ group is within this range, the reactivity with the polyamine is high, and the ion selective permeability and durability of the resulting membrane will be good. The content of the —$(CH_2)_sX$ group is particularly preferably from 1.2 to 3.8 mmol/g, more preferably from 1.5 to 3.0 mmol/g.

In the present invention, it is important to mix polymer 1 and polymer 2 uniformly. As a method for mixing them uniformly, heat kneading or solution mixing may, for example, be employed. However, anion exchange groups and active groups convertible to anion exchange groups, are usually susceptible to thermal decomposition, and accordingly, solution mixing at room temperature is preferred. Particularly preferred is a method of mixing polymer 1 and polymer 2 by dissolving them in their common solvent.

In the present invention, the mixture of polymer 1 and polymer 2 is formed into a membrane. As such a forming method, a casting method is preferred. Here, forming into a membrane may be carried out before cross-linking or after cross-linking.

In the present invention, an aromatic ring in a repeating unit constituting polymer 1 is crosslinked with an aromatic ring in another repeating unit constituting polymer 1. For example, in a case where polymer 1 is a polymer having a repeating unit represented by the formula 1, wherein X is Cl, Br, I or a hydroxyl group, the cross-linking reaction and introduction of anion exchange group can be carried out by the following methods.

(1) A method wherein some of the above substituents are crosslinked by heat treatment or a Friedel-Crafts reaction, and then the remaining substituents are reacted with an amine to introduce anion exchange groups.

(2) A method wherein the above substituents are reacted with a polyamine to carry out introduction of anion exchange groups and cross-linking at the same time.

In the method (1), in a case where polymer 2 is an aromatic hydrocarbon compound, the aromatic ring in a repeating unit constituting polymer 1 will crosslink not only with an aromatic ring in another repeating unit constituting polymer 1 but also with the aromatic ring in a repeating unit constituting polymer 2.

Further, in a case where polymer 1 is a polymer having a repeating unit represented by the formula 1, wherein X is —$NR^1R^2$, a method may be employed wherein an alkylene dihalide or the like is used for cross-linking and conversion to a quaternary ammonium base.

In a case where polymer 1 is a polymer having a repeating unit represented by the formula 1, wherein X is Cl, Br or I, and polymer 2 is a polymer represented by the formula 2, it is preferred to employ a polyamine for cross-linking. Here, the polyaxnine may, for example, be a primary or secondary amine compound such as ethylene diamine, diethylene triamine, triethylene tetramine, tetraethylenepentamine, polyethyleneimine or phenylenedianilne, or N,N,N',N'-tetramethyldiaminomethane, N,N,N',N'-tetramethyl-1,2-diaminoethane, N,N,N',N'-tetramethyl-1,3-diaminopropane, N,N,N',N'-tetramethyl-1,6-diaminohexane, N,N,N',N'-tetramethylbenzidine, N,N,N',N'-tetramethyl-4,4'-diaminodiphenylmethane, polyvinyl pyridine or a primary or secondary aminated product from polychloromethylstyrene.

It is particularly preferred to employ a polyamine represented by the formula 3 and having two primary to tertiary amines at its molecular terminals (in the formula 3, t is an integer of from 1 to 5, and R is a hydrogen atom, a $C_{1-5}$ alkyl group or a $C_{1-5}$ hydroxyalkyl group), since the reactivity in amination is high, the film properties can easily be controlled by changing the number of methylene groups, and it can be readily available:

$$(R)_2N-(CH_2)_t-N(R)_2 \quad \text{Formula 3}$$

Now, specific examples for the process for producing an anion exchange membrane of the present invention, will be described.

(1) A method wherein haloalkyl groups are introduced to aromatic rings of a polymer having a repeating unit represented by the formula 4 (a precursor of the polymer having a repeating unit represented by the formula 1, in the formula 4, W, $Q^1$, $Q^2$, a and b are the same as defined in the formula 1, provided that an aromatic ring of W does not have a —$(CH_2)_sX$ group, hereinafter referred to as a polymer of the formula 4), followed by mixing with polymer 2, and haloalkyl groups are reacted with a monoamine and a polyamine.

(2) A method wherein a polymer of the formula 5 and polymer 2 of the formula 2, wherein Y is O or S, are mixed, and then haloalkyl groups are selectively introduced to aromatic rings of the polymer of the formula 5, and the haloalkyl groups are reacted with a monoamine and a polyamine:

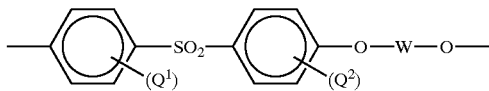

Formula 5

In the methods (1) and (2), the intrinsic viscosity of the mixture of polymer 1 and polymer 2, is usually from 0.1 to 3 dl/g, preferably from 0.2 to 2 dl/g, more preferably from 0.4 to 1.5 dl/g.

Here, the haloalkyl group may, for example, be a chloromethyl group, a bromomethyl group, a 3-bromopropyl group, a 4-bromobutyl group or a 5-bromopentyl group. However, a chloromethyl group is preferred, since the reaction is thereby easy. When chloromethyl groups are to be introduced, the polymer of the formula 4 is reacted with (chloromethyl)methyl ether, 1,4-bis(chloromethoxy)butane, 1-chloromethoxy-4-chlorobutane or a nucleophilic chloromethylating agent of a formalin/hydrogen chloride type or a paraformaldehyde/hydrogen chloride type, in a solvent of a halogenated hydrocarbon such as trichloroethane or tetrachloroethane. At that time, tin chloride or the like may be employed as a catalyst.

The mixture of the polymer of the formula 4 as polymer 1 having haloalkyl groups introduced, and polymer 2, obtained as described above, is reacted with a monoamine and a polyamine, and casting is carried out before or after this amination, whereby an anion exchange membrane can be obtained. Specific examples of this method will be given below.

(1) The polymer of the formula 4 having haloalkyl groups introduced (polymer 1) and polymer 2 are dissolved in a solvent, and a predetermined amount of a monoamine is added and reacted with a predetermined amount of the haloalkyl groups, followed by casting to form a membrane, and the obtained membrane is immersed in a polyamine solution to react the remaining haloalkyl groups with the polyamine.

(2) A method wherein the polymer of the formula 4 having haloalkyl groups introduced (polymer 1) is dissolved in a solvent, a predetermined amount of a monoamine is added and reacted with a predetermined amount of the haloalkyl groups, and the solution thereby obtained is mixed with a solution having polymer 2 dissolved therein, followed by casting to form a membrane, and the obtained membrane is immersed in a polyamine solution, to have the remaining haloalkyl groups reacted with the polyamine.

(3) A method wherein the polymer of the formula 4 having haloalkyl groups introduced (polymer 1) and polymer 2 are dissolved in a solvent, then a predetermined amount of a mixed solution of a monoamine and a polyamine is added and reacted with the haloalkyl groups, followed by casting to form a membrane.

(4) A method wherein the polymer of the formula 4 having haloalkyl groups introduced (polymer 1) and polymer 2 are dissolved in a solvent, followed by casting to form a membrane, and then the obtained membrane is immersed in a mixed solution of a monoamine and a polyamine to react them with the haloalkyl groups.

Among them, the method (1) or (2) is preferred in a case where it is necessary to precisely control the ratio of the haloalkyl groups to be reacted with the monoamine to the haloalkyl groups to be reacted with the polyamine.

Here, as the monoamine, a primary to tertiary amine can be used, but a tertiary amine is preferred from the viewpoint of the reactivity or the chemical stability as an ion exchange group. Specifically, a trialkylamine such as trimethylamine, triethylamine, tributylamine, an aromatic amine such as N,N-dimethylaniline or N-methylpyrrole, a heterocyclic amine such as N-methylpyrrolidine or N-methylmorpholine, or an alcohol amine such as N-methyl-N,N-diethanolamine, N,N-dimethyl-N-ethanolamine, triethanolamine, may be mentioned. Among them, trimethylamine is preferably employed, since a membrane having low electric resistance can thereby be obtained. Further, a preferred polyamine is as described above.

A preferred ion exchange capacity of the anion exchange membrane obtained by the process of the present invention, may vary depending upon the particular application, but it is preferably selected to be from 1.0 to 3.5 meq/g dry resin. If the ion exchange capacity is smaller than 1.0 meq/g dry resin, the electrical resistance tends to be high, and if it exceeds 3.5 meq/g dry resin, the ion selective permeability tends to decrease, and the permeability of water will increase. The above ion exchange capacity is particularly preferably from 1.7 to 3.2 meq/g dry resin.

A preferred thickness of the anion exchange membrane obtained in the present invention is preferably from 0.1 to 300 μm, more preferably from 1 to 100 μm, particularly preferably from 5 to 50 μm, although it varies depending upon the particular application and the conditions for use of the anion exchange membrane.

Further, a laminated membrane having the anion exchange membrane obtained by the process of the present invention, laminated on at least one side of a cation exchange membrane, is effective as a hydrogen ion selective permeation membrane and can be used preferably in a case where an acid is selectively concentrated and recovered from an acid aqueous solution containing hydrogen ions and other cations, by electrodialysis. The cation exchange membrane in such a laminated membrane is preferably one having an ion exchange capacity of from 1.0 to 3.8 meq/g dry resin and a thickness of from 10 to 200 μm. Further, the thickness of the anion exchange membrane to be laminated, is preferably from 0.1 to 10 μm.

Further, the anion exchange membrane obtainable by the process of the present invention, is preferably one having a resistivity of from 50 to 6,000 Ω·cm in a 0.5 mol/l sulfuric acid aqueous solution at 25° C. When the resistivity is within this range, the ion selective permeability is excellent. Accordingly, in the recovery of an acid by diffusion dialysis, there will be no substantial leakage of impurity ions such as metal ions, and the acid can be recovered in high purity. Also, in electrodialysis or electrolysis, there will be no substantial leakage of impurities, and deterioration in the current efficiency will scarcely take place. In an application where the ion selective permeability and durability are important, an ion exchange membrane having the resistivity of from 300 to 3,000 Ω·cm is preferred, and in an application where the ion selective permeability is particularly important, an anion exchange membrane having the resistivity of from 60 to 300 Ω·cm, is preferred.

Further, as the anion exchange membrane obtainable by the process of the present invention, one having an areal resistance of from 0.1 to 20 Ω·cm$^2$ in a 0.5 mol/Q sulfuric acid aqueous solution at 25° C., is preferred. The areal resistance can be made to be within the above range by changing the membrane thickness depending upon the resistivity of the anion exchange membrane. Here, the areal resistance is a value measured by a LCR meter by an alternate current of 1,000 Hz by bringing the membrane to be equilibrium in a 0.5 mol/l sulfuric acid aqueous solution. When a membrane having an areal resistance within the above range, is used for concentrating an electrolyte by electrodialysis, the operation can be carried out at a high current efficiency, and the concentration of the obtained electrolyte can be made high. Further, also when it is used in electrolysis, the operation can be carried out at a high current efficiency.

In an application where the ion permeability is important, such an areal resistance is preferably from 0.1 to 2 Ω·cm$^2$. In an application where the ion selectivity or low permeability of water are important, the areal resistance is preferably from 1 to 10 Ω·cm$^2$, and in an application where low permeability of hydrogen ions is important, the areal resistance is preferably from 5 to 20 Ω·cm$^2$.

By adjusting the areal resistance within the above range, the anion exchange membrane obtainable by the process of the present invention can satisfy contrary characteristics such as low electrical resistance, high ion selectivity, low permeability of water, excellent corrosion resistance and high mechanical strength. In order to adjust the areal resistance to the above range, it is effective to reduce the thickness of the anion exchange membrane. A preferred thickness varies depending upon the particular purpose and the conditions of use of the anion exchange membrane, but it is usually from 0.1 to 50 μm, preferably from 1 to 25 μm. It is preferred to adjust the above areal resistance to from 0.1 to 20 Ω·cm$^2$ within this thickness range.

The anion exchange membrane obtainable by the process of the present invention can be used alone as an ion exchange membrane. However, in a case where the membrane thickness is thin, and the membrane area for use is large, it is preferred to employ the anion exchange membrane as laminated with a substrate from the viewpoint of the dimensional stability and the handling or with a view to lowering the resistivity. The substrate for lamination and the lamination method may, for example, be preferably the porous substrate and the lamination method disclosed in JP-A-2-265929 or JP-A-6-80799. For example, the porous substrate is preferably a non-woven fabric of e.g. polyethylene, polypropylene or polytetrafluoroethylene, or a microporous membrane obtainable by a stretch expansion method. The lamination method is preferably a method wherein a preliminarily prepared anion exchange membrane and a porous substrate are bonded by a so-called wet lamination method using a solution of a precursor of the anion exchanger as an adhesive.

The anion exchange membrane obtainable by the process of the present invention can be used preferably in a method for recovering an acid, wherein an aqueous solution containing the acid (hereinafter referred to as an aqueous acid solution) is contacted to one side of the anion exchange membrane, and water or an aqueous acid solution having a concentration lower than the above aqueous solution, is contacted to the other side, whereby the acid is recovered by diffusion dialysis. By employing the anion exchange membrane of the present invention, an acid of high purity can be efficiently recovered constantly. Particularly, the anion exchange membrane of the present invention having an areal resistance of from 0.2 to 2.0 Ω·cm$^2$ is preferably used for diffusion dialysis of an acid, since the permeability of the acid is thereby large, and leakage of metal ions is little.

Specifically, it is preferred that the anion exchange membrane and a spacer net having a thickness of from 0.5 to 5 mm are alternately disposed, to define a compartment to which a feed solution containing the acid is to be supplied, and a compartment to which water is supplied, alternately, and the feed solution containing the acid, and water, are supplied to the respective compartments at a rate of from 0.7 to 5 l/hr per 1 m$^2$ of the effective area of the membrane, to recover the acid. The operation temperature at that time is preferably from 25 to 60° C. If the temperature is lower than 25° C., the permeation rate of the acid tends to be low. On the other hand, if it exceeds 60° C., the materials for the compartment frames or spacers are required to have heat resistance and tend to be expensive, such being undesirable except for a special application.

Further, the anion exchange membrane obtainable by the process of the present invention, can be used preferably in a method for concentrating an electrolyte by electrodialysis, wherein a cation exchange membrane or a hydrogen ion selective permeation membrane, and an anion exchange membrane, are alternately disposed between a cathode and an anode, and a voltage is applied while supplying an electrolyte solution.

Specifically, for example, between an anode compartment provided with an anode and a cathode compartment provided with a cathode, a plurality of cation exchange membranes and anion exchange membranes are alternately disposed to define from 2 to 300 sets of a demineralizing compartment with its anode side partitioned by an anion exchange membrane and with its cathode side partitioned by a cation exchange membrane and a concentrating compartment with its anode side partitioned by a cation exchange membrane and with its cathode side partitioned by an anion exchange membrane, which are alternately disposed. The concentration and recovery are carried out by conducting an electric current, while circulating a feed solution containing an electrolyte to the demineralizing compartments from a feed solution tank and circulating an electrolyte solution to recover the concentrated electrolyte, to the concentrating compartments. It is preferred to apply a voltage of from 0.2 to 2V to each demineralizing compartment and to each concentrating compartment, so as to bring a current value to a level of at most the critical current density.

Further, the anion exchange membrane obtainable by the process of the present invention, can be used preferably in an electrolytic method wherein a cation exchange membrane and an anion exchange membrane are disposed between a cathode and an anode, so that the cathode side will be the cation exchange membrane, and electrolysis is carried out by applying a voltage while supplying an electrolyte solution or an aqueous solution containing organic substances, or in an electrolytic method wherein only an anion exchange membrane is disposed between a cathode and an anode, and electrolysis is carried out by applying a voltage while supplying an electrolyte solution or an aqueous solution containing organic substances. By using the anion exchange membrane of the present invention, the operation can be carried out constantly at a high current efficiency.

Specifically, for example, electrolysis is carried out by applying a voltage while supplying an electrolyte solution or aqueous solution containing organic substances, to an intermediate compartment defined by the cation exchange membrane and the anion exchange membrane in the case where the cation exchange membrane and the anion exchange membrane are disposed between the cathode and the anode, so that the cathode side will be the cation exchange membrane, or to the cathode compartment in the case where only the anion exchange membrane is disposed between the cathode and the anode. Here, a preferred voltage varies depending upon the electrolytic reaction, but a voltage of from 0.2 to 10V is preferred, whereby the electrolytic reaction proceeds sufficiently.

Further, the anion exchange membrane obtainable by the process of the present invention is excellent in corrosion resistance and thus is useful as a diaphragm for a redox flow cell wherein a positive electrode and a negative electrode are separated by the diaphragm, and an oxidation reduction reaction is carried out by supplying a positive electrode liquid and a negative electrode liquid to the positive electrode and the negative electrode, respectively, for charge and discharge.

Further, the anion exchange membrane obtainable by the present invention may be formed not only into a common flat shape but also into a bag, hollow fiber or hollow tube shape.

Now, preferred embodiments of the second aspect of the present invention will be described.

The anion exchanger of the present invention is made of a polymer having some or all of haloalkyl groups in an aromatic polysulfone polymer having a repeating unit represented by the formula 1, reacted with an amine. In the above aromatic polysulfone polymer, the content of the repeating unit represented by the formula 1, is preferably at least 80 mass %.

Further, the anion exchanger of the present invention may be used as mixed with a polymer having no anion exchange groups, for the purpose of e.g. improvement of the mechanical properties. Especially, an anion exchanger made of a mixture comprising the anion exchanger of the present invention and the polymer represented by the above formula 2, is preferably employed, since it is excellent in the ion selective permeability and excellent in the mechanical properties and chemical resistance.

As the polymer represented by the formula 2, preferred is one wherein Y is O-Ph-Ph-O and Z is O, one wherein Y is O-Ph-Ph-O, Z is S, Y is O, and n is 0, or one wherein Y is O-Ph-Ph-O, and n is 0, from the viewpoint of the compatibility with the anion exchanger of the present invention, the mechanical properties, durability, etc., of the anion exchanger made of the obtained mixture.

The mixing ratio of the anion exchanger of the present invention and the polymer represented by the formula 2 is preferably such that the polymer represented by the formula 2 is from 5 to 300 parts by mass per 100 parts by mass of the anion exchanger.

As the anion exchanger of the present invention, it is preferred that the content of haloalkyl groups in the above aromatic polysulfone polymer is from 1.0 to 4.0 mmol/g. When the content of haloalkyl groups is within the above range, the reactivity with the amine is high, and the ion selective permeability of the resulting anion exchanger will be good. The content of the haloalkyl groups is particularly preferably from 1.5 to 3.5 mmol/g.

Further, as the anion exchanger of the present invention, preferred is one wherein the ratio of the haloalkyl groups reacted with the amine is at least 30 mol % of all haloalkyl groups contained in the above aromatic polysulfone polymer. By properly selecting the content of the haloalkyl groups in the above polysulfone polymer and the ratio of the haloalkyl groups reacted with the amine to all haloalkyl groups, it is possible to obtain an anion exchanger having the desired ion exchange capacity. The above ratio of the haloalkyl groups is particularly preferably at least 50 mol %.

The ion exchange capacity of the anion exchanger of the present invention is preferably from 0.5 to 4.0 meq/g dry resin. If the ion exchange capacity is smaller than 0.5 meq/g dry resin, the resistivity tends to be high, and if it exceeds 4.0 meq/g dry resin, the ion selective permeability tends to decrease. The ion exchange capacity is more preferably from 0.8 to 3.5 meq/g dry resin, particularly preferably from 1.7 to 3.2 meq/g dry resin.

The anion exchanger of the present invention which is formed into a membrane shape, is useful for various applications as an ion exchange membrane. The anion exchange membrane of the present invention has a relatively high ion exchange capacity. Nevertheless, the fixed ion concentration can be made high at a level of at least 4 meq/g $H_2O$, preferably at least 6 meq/g $H_2O$, whereby high ion selectivity and high permeability can be provided.

As the anion exchange membrane of the present invention, like the anion exchange membrane obtainable by the process according to the first aspect of the present invention, the alternate current resistivity in a 0.5 mol/l sulfuric acid aqueous solution at 25° C. is preferably from 50 to 6,000 Ω·cm. Further, also the thickness of the anion exchange membrane of the present invention is preferably equal to the thickness of the anion exchange membrane obtainable by the process according to the first aspect of the present invention.

The anion exchanger of the present invention can be obtained by reacting some or all of haloalkyl groups in the aromatic polysulfone polymer having a repeating unit represented by the formula 4, with an amine.

The haloalkyl groups are preferably —$(CH_2)_sX$ (wherein s is an integer of from 1 to 5, and X is Cl, Br or I), more preferably chloromethyl groups, 3-bromopropyl groups, 4-bromobutyl groups or 5-bromopentyl groups, particularly preferably chloromethyl groups, since the reaction is easy. To introduce chloromethyl groups, for example, an aromatic polysulfone polymer having biphenyl rings may be reacted with (chloromethyl)methyl ether, 1,4-bis(chloromethoxy)butane, 1-chloromethoxy-4-chlorobutane, or an electrophilic reactive chloromethylation agent of a formalin/hydrogen chloride type or a paraformaldehyde/hydrogen chloride type. At that time, tin chloride or the like may be employed as a catalyst, whereby it is possible to selectively introduce chloromethyl groups to the biphenyl rings of the aromatic polysulfone polymer.

To obtain the anion exchanger containing a predetermined amount of haloalkyl groups of the present invention, it is preferred to add a compound containing a methoxy group as a reaction terminating agent at the time of terminating the haloalkylation reaction, whereby it is possible not only to control the amount of haloalkyl groups to be introduced, but also to prevent gelation of the polymer when purifying the resulting aromatic polysulfone polymer having haloalkyl groups.

As such a compound containing a methoxy group, a methoxy alcohol such as 1-methoxyethanol or 2-methoxyethanol, an aromatic compound such as anisole or p-methoxyphenol, or a compound having two methoxy groups such as 1,2-dimethoxyethane, may be mentioned. Among them, 1,2-dimethoxyethane is preferred, since it is stable.

The chloromethylated polymer thus obtained is aminated and formed into a membrane, for example, by the following methods.

(1) A method wherein the chloromethylated polymer is dissolved in a solvent, a monoamine is added to have a predetermined amount of chloromethyl groups reacted with the monoamine, and such a reacted solution is cast to form a membrane.

(2) A method wherein a solution having the chloromethylated polymer dissolved in a solvent, is cast to form a membrane, whereupon a monoamine is added to have a predetermined amount of chloromethyl groups reacted with the monoamine.

(3) A method wherein the chloromethylated polymer is dissolved in a solvent, some, preferably from 20 to 80 mol %, of chloromethyl groups are reacted with a monoamine, followed by forming into a membrane, and then the rest of chloromethyl groups are subjected to heat treatment, contacting with a Lewis acid, or a reaction with a polyamine having at least two amino groups, to introduce crosslinked structures.

Here, as the monoamine, a primary to tertiary amine may be employed. Here, the primary amine may, for example, be an alkylamine such as methylamine, ethylamine, n-propylamine or n-butylamine, an aromatic amine such as aniline, or ethanolamine. The secondary amine may, for example, be a dialkylamine such as dimethylamine or diethylamine, an aromatic amine such as N-methylaniline, a heterocyclic amine such as pyrrolidine, piperazine or morpholine, or diethanolamine.

Further, the tertiary amine may, for example, be a trialkylamine such as trimethylamine or triethylamine, an aromatic amine such as N,N-dimethylaniline, N-methyldiphenylamine, pyridine, quinoline, acridine, N-methylpyrrole, 1-methylindole or N-ethylcarbazole, a heterocyclic amine such as N-methylpyrrolidine or N-methylmorpholine, or triethanolamine. Among them, trimethylamine is preferably employed, since a membrane having a low resistivity can thereby be obtained.

Further, among polyamines capable of introducing crosslinked structures and anion exchange groups, to be used in the method (3), the one having two amino groups, is preferably one represented by the formula 6, or a heterocyclic diamine.

$(A^1)$ $(A^2)$-N—$(CH_2)_u$-$(A^3)$ $(A^4)$    Formula 6

In the formula 6, each of $A^1$, $A^2$, $A^3$ and $A^4$ which are the same as or different from one another, is a hydrogen atom, a $C_{1-6}$ alkyl group or a $C_{1-6}$ hydroxyalkyl group, and u is an integer of from 1 to 15. Specifically, methylenediamine, ethylenediamine, trimethylenediamine, hexamethylenediamine, phenylenediamine, pyridazine, pyrimidine, pyrazine, cinnoline, phthalazine, quinazoline, quinoxaline, 1-methylimidazole, N,N'-dimethylpiperazine or (1,4) diazabicyclo (2,2,2) octane may be mentioned. One having at least three amino groups may, for example, be a polyethyleneimine compound such as diethylenetriamine, triethylenetetramine or tetraethyleneheptamine, or a cyclic polyamine such as triazine or hexamethylenetetramine.

Further, the anion exchange membrane of the present invention may be used alone, but may be employed as complexed and reinforced with a porous substrate to impart practical strength for handling or to reduce the resistivity. A preferred form of the porous substrate and a preferred method for the complexing are the same as in the case described above with respect to the process for producing an anion exchange membrane according to the first aspect of the present invention.

Further, also the anion exchange membrane of the present invention may be formed not only into a common flat shape but also into a bag, hollow fiber or hollow tube shape.

Now, Examples (Examples 1 and 3) according to the first aspect of the present invention and Comparative Examples (Examples 2 and 4) will be described.

EXAMPLE 1

As a precursor for polymer 1, an aromatic polysulfone polymer represented by the formula 7 (Radel R5000NT, trade name, manufactured by Amoco Engineering Polymers Limited) was prepared. The intrinsic viscosity of this polymer was 0.65 dl/g.

Formula 7

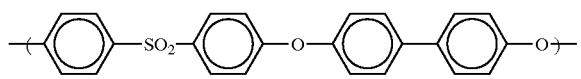

75 g of the above polymer was dissolved in 1,020 ml of 1,1,2,2-tetrachloroethane, and 400 g of chloromethyl methyl ether and 4.5 g of anhydrous tin chloride were added, whereupon a chloromethylation reaction was carried out at 80° C. over 6 hours. After completion of the reaction, the reaction product was precipitated by using 5,000 ml of methanol, and the reaction product was washed to obtain a chloromethylated polymer (1). The content of chloromethyl groups in this chloromethylated polymer (1) was 3.84 meq/g, and the ion exchange capacity in a case where the chloromethyl groups were all reacted with a trimethylamine, was 3.1 meq/g dry resin.

A mixture of polymers comprising 71 parts by mass of this chloromethylated polymer (1) and 29 parts by mass of polyether sulfone (PES5200P, trade name, manufactured by Sumitomo Chemical Co., Ltd.) as polymer 2, was dissolved in N,N-dimethylformamide (hereinafter referred to as DMF) to obtain a solution containing 15 mass % of said mixture of polymers. The content of chloromethyl groups in this mixture of polymers, was 2.7 mmol/g, and the ion exchange capacity in a case where the chloromethyl groups were all reacted with trimethylamine, was 2.3 meq/g dry resin.

Then, while stirring the above solution at 0° C., a mixture of a DMF solution containing 1 mol/l of trimethylamine, and 2-methoxyethanol (the mixing ratio being the DMF solution/2-methoxyethanol=97/3 by mass ratio) was slowly dropwise added. Thus, an aminated solution A having 40 mol % of chloromethyl groups reacted with trimethylamine, was obtained.

The aminated solution A was cast on a glass sheet and dried at 60° C. for two hours to obtain a cast membrane A having a thickness of 20 μm. Then, the cast membrane A was immersed in a methanol solution containing 0.75 mol/l of N,N,N',N'-tetramethyl-1,3-diaminopropane at 55° C. for 24 hours, to have the remaining chloromethyl groups reacted with this diamine compound. The resistivity of the diamine-treated membrane A in a 0.5 mol/l sulfuric acid aqueous solution at 25° C., was 2000 Ω.cm, and the areal resistance was 0.5 0 Ω.cm².

EXAMPLE 2

In the same manner as in Example 1 except that 29 parts by mass of polyether sulfone (PES5200P, trade name, manufactured by Sumitomo Chemical Co., Ltd.) was not used, an aminated solution B comprising only the chloromethylated polymer (1) and having 40 mol % of the chloromethylated groups reacted with trimethylamine, was prepared, and a cast membrane B having a thickness of 20 μm was prepared. Then, in the same manner as in Example 1, a diamine-treated membrane B was obtained from the cast membrane B. The diamine-treated membrane was brittle, and the resistivity in a 0.5 mol/l sulfuric acid aqueous solution at 25° C. was 150 Ω·cm, and the areal resistance was 0.3 Ω·cm².

EXAMPLE 3

0.36 mol of 4,4'-diphenol was reacted with 0.324 mol of 4,4'-dichlorodiphenylsulfone to prepare 0.36 mol of a precursor of p=10 comprising aromatic polysulfone units. Then, 0.36 mol of the precursor, 0.235 mol of 4,4'-dichlorodiphenylsulfone and 0.18 mol of 4,4'-dihydroxydiphenylsulfone, were reacted to obtain 215 g of a block copolymer of aromatic polysulfone/polyether sulfone represented by the formula 8, wherein p=q. The intrinsic viscosity of this block copolymer was 0.53 dl/g.

Formula 8

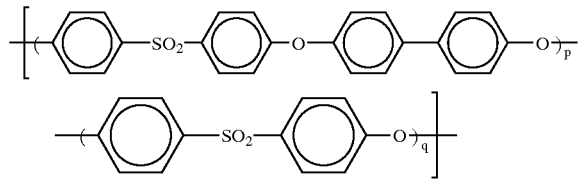

The above block copolymer was chloromethylated in the same manner as in Example 1 to obtain a chloromethylated copolymer (2). The content of chloromethyl groups in this chloromethylated copolymer (2) was 2.7 mmol/g, and the ion exchange capacity in a case where the chloromethylated groups were all reacted with trimethylamine, was 2.3 meq/g dry resin. Then, a mixture of polymers comprising 90 parts by mass of this chloromethylated polymer (2) and 10 parts by mass of a polyether sulfone (PES5200P, trade name, manufactured by Sumitomo Chemical Co., Ltd.) as polymer 2, was dissolved in DMF to obtain a solution containing 15 mass % of said mixture of polymers. Here, the content of chloromethyl groups in this mixture of polymers, was 2.4 mmol/g, the ion exchange capacity in a case where the chloromethyl groups were all reacted with trimethylamine, was 2.1 meq/g dry resin.

Then, in the same manner as in Example 1, an aminated solution C having 43 mol % of the chloromethyl groups reacted with trimethylamine, was obtained, and a cast membrane C having a thickness of 20 μm was prepared and treated to obtain a diamine-treated membrane C. The resistivity of the diamine treated membrane C in a 0.5 mol/l sulfuric acid aqueous solution at 25° C., was 200 Ω·cm, and the areal resistance was 0.5 Ω·cm².

EXAMPLE 4

In the same manner as in Example 3 except that 10 parts by mass of the polyether sulfone (PES5200P, trade name, manufactured by Sumitomo Chemical Co., Ltd.) was not used, an aminated solution D comprising only the chloromethylated polymer (2) and having 40 mol % of the chloromethyl groups reacted with trimethylamine, was obtained, and a cast membrane D having a thickness of 20 μm was prepared and treated to obtain a diamine-treated membrane D. The resistivity of the diamine treated membrane D in a 0.5 mol/l sulfuric acid aqueous solution at 25° C., was 200 Ω·cm, and the areal resistance was 0.5 Ω·cm².

Evaluation Result 1

Diamine treated membranes as obtained in Examples 1 to 4 were prepared. Further, these diamine treated membranes were immersed in a mixed solution comprising 100 parts of a saturated solution of ammonium methavanadate and 5 parts of a 30 mass % hydrogen peroxide aqueous solution at 25° C. for one day, and then thoroughly washed with water (diamine treated membranes A', B', C' and D').

Using these diamine treated membranes, recovery of an acid by diffusion dialysis was carried out as follows. The membranes were, respectively, set in two compartment cells, and on one side of each membrane, 3 mol/l of sulfuric acid containing 0.5 mol/l of aluminum ions, was charged, and on the other side, water was charged. The concentrations of the acid and aluminum ions diffused to the water side were measured, whereby the permeation coefficient of the acid $(mol·m^{-2}·h^{-1}·(mol/l)^{-1})$, the permeation coefficient of aluminum ions $(mol·m^{-2}·h^{-1}·(mol/l)^{-1})$, and the permeation coefficient ratio (aluminum ions/acid) were obtained. The results are shown in Table 1.

From Table 1, it is evident that diamine treated membranes A and C of the present invention have high ion selective permeability and are excellent in oxidation resistance, as compared with other diamine treated membranes.

TABLE 1

| Diamine treated membranes | Permeation coefficient of acid | Permeation coefficient of aluminum ions | Permeation coefficient ratio |
| --- | --- | --- | --- |
| A | 15 | 0.015 | 0.001 |
| B | 20 | 0.20 | 0.01 |
| C | 13 | 0.013 | 0.001 |
| D | 13 | 0.013 | 0.001 |
| A' | 15 | 0.015 | 0.001 |
| B' | 25 | 2.5 | 0.1 |
| C' | 13 | 0.013 | 0.001 |
| D' | 15 | 0.15 | 0.01 |

Now, Examples (Examples 5 to 7) according to the second aspect of the present invention and Comparative Example (Example 8) will be described.

EXAMPLE 5

40 g of a polysulfone (Radel R5000NT, trade name, manufactured by Amoco Engineering Polymers Company) represented by the formula 9 and having an intrinsic viscosity of 0.5 dl/g, was prepared.

Formula 9

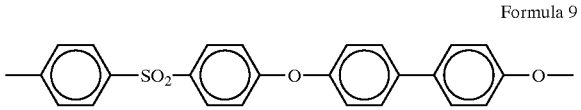

To a solution having this polysulfone dissolved in 737 g of 1,1,2,2-tetrachloroethane, a solution having 171 g of chloromethyl methyl ether and 4 g of anhydrous tin chloride dissolved in 36 g of chloromethyl methyl ether, was added, whereupon a chloromethylation reaction was carried out at 80° C. for 6 hours. Then, 18 g of 1,2-dimethoxyethane was added, followed by stirring for 30 minutes to terminate the reaction. Then, the obtained reaction product was diluted with methylene chloride and precipitated by an addition of methanol. The precipitate was washed to obtain a chloromethylated polymer E having an intrinsic viscosity of 0.7 dl/g.

The content of chloromethyl groups in the chloromethylated polymer E was 3.7 mmol/g, and the ion exchange capacity in a case where the chloromethyl groups were all reacted with trimethylamine, was 3.1 meq/g dry resin.

50 g of this chloromethylated polymer E was dissolved in 300 ml of N,N-dimethylformamide (hereinafter referred to as DMF) to obtain a 15 mass % solution. While cooling and stirring this solution, 104 ml of a DMF solution containing 1 mol/l of trimethylamine of 0° C. was slowly dropwise added. Then, 65 g of 2-methoxyethanol was added to obtain a solution E having an ion exchange capacity of 2.0 meq/g dry resin.

This solution E was coated on a polyethylene terephthalate (hereinafter referred to as PET) film and heat-dried at 80° C. for one hour to form an anion exchange membrane E having a thickness of 25 μm, whereupon the PET film was peeled from the anion exchange membrane E. The fixed ion concentration of the obtained anion exchange membrane E was 10 meq/g.H$_2$O, and the alternate current resistivity in a 0.5 mol/l sulfuric acid aqueous solution at 25° C., was 200 Ω·cm.

EXAMPLE 6

In the same manner as in Example 5 except that the temperature for the chloromethylation reaction was changed to 75° C., a chloromethylated polymer F was obtained. The intrinsic viscosity of the chloromethylated polymer F was 0.6 dl/g, and the content of the chloromethyl groups was 3.5 mmol/g, and the ion exchange capacity in a case where the chloromethyl groups were all reacted with trimethylamine, was 2.8 meq/g dry resin.

This chloromethylated polymer F was aminated in the same manner as in Example 5 to obtain a solution F having an ion exchange capacity of 2.3 meq/g dry resin, and in the same manner as in Example 5, an anion exchange membrane F having a thickness of 25 μm, was prepared. The fixed ion concentration of the anion exchange membrane F was 8 meq/g·H$_2$O, and the alternate current resistivity in a 0.5 mol/l sulfuric acid aqueous solution at 25° C., was 258 Ω·cm.

EXAMPLE 7

In the same manner as in Example 5 except that the temperature for the chloromethylation reaction was changed to 50° C., a chloromethylated polymer G was obtained. The intrinsic viscosity of the chloromethylated polymer G was 0.6 dl/g, the content of the chloromethyl groups was 2.4 mmol/g, and the ion exchange capacity in a case where the chloromethyl groups were all reacted with trimethylamine, was 2.1 meq/g dry resin.

This chloromethylated polymer G was aminated in the same manner as in Example 5 to obtain a solution G having an ion exchange capacity of 2.0 meq/g dry resin, and in the same manner as in Example 5, an anion exchange membrane G having a thickness of 25 μm, was prepared. The fixed ion concentration of the anion exchange membrane G was 8 meq/g·H$_2$O, and the alternate current resistivity in a 0.5 mol/l sulfuric acid aqueous solution at 25° C. was 270 Ω·cm.

EXAMPLE 8 (COMPARATIVE EXAMPLE)

A polysulfone (Udel P3500, trade name, manufactured by Amoco Engineering Polymers Company) represented by the formula 10 and having an intrinsic viscosity of 0.4 dl/g, was prepared.

Formula 10

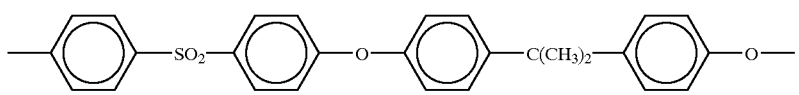

In the same manner as in Example 5, a chloromethylation reaction was carried out at 75° C. over 6 hours, and the obtained reaction product was precipitated and washed in the same manner as in Example 5 to obtain a chloromethylated polymer H having an intrinsic viscosity of 0.65 dl/g. The content of chloromethyl groups in the chloromethylated polymer H was 3.2 mmol/g, and the ion exchange capacity in a case where the chloromethyl groups were all reacted with trimethylamine, was 2.7 meq/g dry resin.

This chloromethylated polymer H was aminated in the same manner as in Example 5 to obtain a solution H having an ion exchange capacity of 2.3 meq/g dry resin. In the same manner as in Example 5, an anion exchange membrane H having a thickness of 25 μm was prepared. The fixed ion concentration of the anion exchange membrane H was 5 meq/g·H$_2$O, and the alternate current resistivity in a 0.5 mol/l sulfuric acid aqueous solution at 25° C., was 110 Ω·cm.

Evaluation Result 2

Using the anion exchange membranes obtained in Examples 5 to 8, recovery of an acid by diffusion dialysis was carried out as follows. The anion exchange membranes were, respectively, set in two compartment cells, and in one compartment, 3 mol/l of sulfuric acid containing 0.4 mol of aluminum ions, was filled, and in the other compartment, pure water was supplied. The concentrations of the acid and aluminum ions diffused to the pure water side were measured, and the permeation coefficient of the acid, the permeation coefficient of aluminum ions, and the permeation coefficient ratio of the acid and aluminum ions, were obtained.

Further, each membrane after the above measurement, was immersed in pure water at 25° C. for two weeks to let it swell, whereupon in the same manner as above, the permeation coefficient of the acid (mol·m$^{-2}$·h$^{-1}$·(mol/l)$^{-1}$), the permeation coefficient of aluminum ions (mol·m$^{-2}$·h$^{-1}$·(mol/l)$^{-1}$), and the permeation coefficient ratio of the acid and aluminum ions, were obtained. The above results are shown in Table 2. It is evident that the anion exchange membranes of the present invention are excellent in selective permeability of the acid and also excellent in the performance after being swelled in deionized water.

TABLE 2

|  |  | Ex. 5 | Ex. 6 | Ex. 7 | Ex. 8 |
|---|---|---|---|---|---|
| Before swelling | Permeation coefficient of acid | 7.5 | 6.5 | 5.8 | 7.8 |
|  | Permeation coefficient of aluminum ions | 0.00008 | 0.006 | 0.0006 | 0.008 |
|  | Permeation coefficient ratio (acid/aluminum ions) | $9.4 \times 10^4$ | $1.1 \times 10^3$ | $9.7 \times 10^3$ | $9.8 \times 10^2$ |
| After swelling | Permeation coefficient of acid | 16.5 | 17.1 | 17.9 | 25.4 |
|  | Permeation coefficient of aluminum ions | 0.016 | 0.017 | 0.018 | 1.02 |
|  | Permeation coefficient ratio (acid/aluminum ions) | $1.0 \times 10^3$ | $1.0 \times 10^3$ | $9.9 \times 10^2$ | $2.5 \times 10$ |

The anion exchange membrane obtainable by the process of the present invention is excellent in ion selective permeability, chemical resistance and mechanical properties. Further, the membrane can be supplied at a low cost, since the polymer to be used is readily available. Further, by making it a membrane having a relatively high resistivity and a specific areal resistance, an acid of high purity can efficiently be recovered in the recovery of the acid by diffusion dialysis, and in the concentration of an electrolyte by electrodialysis or electrolysis, the degree of concentration and the current efficiency can be improved. Further, the anion exchange membrane obtainable by the process of the present invention, is excellent in corrosion resistance, and it is effective also as a diaphragm for a redox flow cell employing an oxidation/reduction reaction.

Further, the anion exchanger of the present invention has a mechanically strong excellent polysulfone as the basic skeleton and has anion exchange groups selectively introduced in the biphenol structures, whereby it has high ion selective permeability, high permeability and excellent durability. Thus, when an anion exchange membrane made of such an anion ion exchanger, is used for the recovery of an acid by diffusion dialysis, the acid of high purity can efficiently be recovered. Further, when it is used for electrodialysis or electrolysis, the desired acid or alkali can be efficiently obtained at a high concentration.

The entire disclosures of Japanese Patent Application No. 2001-229670 filed on Jul. 30, 2001 and Japanese Patent Application No. 2001-257789 filed on Aug. 28, 2001 including specifications, claims and summaries are incorporated herein by reference in their entireties.

What is claimed is:

1. A process for producing an anion exchange membrane, comprising:
    mixing from 25 to 95 mass % of a polymer 1 having anion exchange groups or active groups convertible to anion exchange groups, and from 5 to 75 mass % of a polymer 2 having no anion exchange groups or no active groups convertible to anion exchange groups,
    cross-linking an aromatic ring of a repeating unit constituting polymer 1 with an aromatic ring of another repeating unit constituting polymer 1 or with a cross-linkable site of polymer 2, and if polymer 1 is a polymer having active groups convertible to anion exchange groups, converting the active groups to anion exchange groups; and
    forming the obtained composition into a membrane.

2. The process for producing an anion exchange membrane according to claim 1, wherein polymer 1 is a polymer having a repeating unit represented by the formula 1, and polymer 2 is a polymer represented by the formula 2:

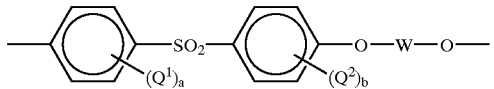

Formula 1

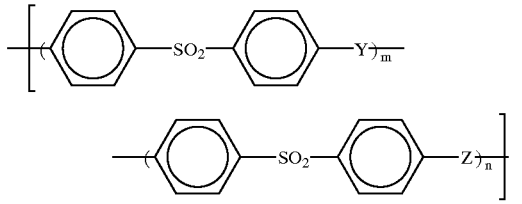

Formula 2 where in the formula 1, W is Ph, Ph-Ph or Ph-C(CH$_3$)$_2$-Ph, Ph is a phenylene group, provided that at least one hydrogen atom bonded to an aromatic ring in W is substituted by —(CH$_2$)$_s$X (wherein s is an integer of from 1 to 5, and X is Cl, Br, I, a hydroxyl group or —NR$^1$R$^2$), each of R$^1$ and R$^2$ which are the same as or different from each other, is a hydrogen atom, a C$_{1-5}$ alkyl group or a C$_{1-5}$ hydroxyalkyl group, each of Q$^1$ and Q$^2$ which are the same as or different from each other, is a C$_{1-8}$ hydrocarbon group or a fluorine atom, and each of a and b is an integer of from 0 to 4, provided that a+b is from 0 to 8, and
    in the formula 2, each of Y and Z which are different from each other, is O, O-Ph-O, O-Ph-Ph-O, O-Ph-C(CH$_3$)$_2$-Ph-O or S, Ph is a phenylene group, m is from 10 to 100, and n is from 0 to 100.

3. The process for producing an anion exchange membrane according to claim 2, wherein polymer 1 is a polymer having a repeating unit represented by the formula 1 wherein W is Ph-Ph, and X is Cl, Br or I.

4. The process for producing an anion exchange membrane according to claim 3, wherein polymer 1 is a polymer having a repeating unit represented by the formula 1 wherein W is Ph-Ph, and X is Cl, and polymer 2 is a polymer represented by the formula 2 wherein Y is O, and n=0.

5. The process for producing an anion exchange membrane according to claim 2, wherein polymer 1 is a polymer having a repeating unit represented by the formula 1 wherein X is Cl, Br or I, and the content of the —(CH$_2$)$_s$X group in the mixture of polymer 1 and polymer 2, is from 1.0 to 4.0 mmol/g.

6. The process for producing an anion exchange membrane according to claim 1, which includes a step of cross-linking an aromatic ring of a repeating unit constituting polymer 1 with an aromatic ring of another repeating unit constituting polymer 1 by a polyamine.

7. The process for producing an anion exchange membrane according to claim 6, wherein the polyamine is a compound represented by the formula 3:

$$(R)_2N-(CH_2)_t-N(R)_2 \quad \text{Formula 3}$$

where in the formula 3, t is an integer of from 1 to 5, and R is a hydrogen atom, a $C_{1-5}$ alkyl group or a $C_{1-5}$ hydroxyalkyl group.

8. The process for producing an anion exchange membrane according to claim 1, wherein the anion exchange membrane has a resistivity of from 50 to 6000 Ω·cm in a 0.5 mol/l sulfuric acid aqueous solution at 25° C.

9. The process for producing an anion exchange membrane according to claim 1, wherein the anion exchange membrane has an areal resistance of from 0.1 to 20 Ω·cm² in a 0.5 mol/l sulfuric acid aqueous solution at 25° C.

10. An anion exchanger, comprising:

an aromatic polysulfone homopolymer having haloalkyl groups and having a repeating unit represented by the formula 4, reacted with an amine:

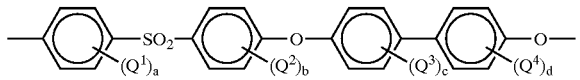

Formula 4 where in the formula 4, each of $Q^1$ and $Q^2$ which are the same as or different from each other, is a $C_{1-8}$ hydrocarbon group or a fluorine atom, and each of a and b is an integer of from 0 to 4, provided that a+b is from 0 to 8, each of $Q^3$ and $Q^4$ which are the same as or different from each other, is a $C_{1-8}$ hydrocarbon group or a fluorine atom, each of c and d is an integer of from 0 to 4, provided that c+d is from 0 to 7, and at least one hydrogen atom bonded to a phenylene group to which $Q^3$ or $Q^4$ can be bonded, is substituted by a haloalkyl group.

11. The anion exchanger according to claim 10, wherein the content of the haloalkyl groups in the aromatic polysulfone homopolymer is from 1.0 to 4.0 mmol/g.

12. The anion exchanger according to claim 10, which has an ion exchange capacity of from 0.5 to 4.0 meq/g dry resin.

13. The anion exchanger according to claim 10, wherein the ratio of the haloalkyl groups reacted with the amine is at least 30 mol % of all haloalkyl groups.

14. The anion exchanger according to claim 10, wherein the amine is a monoamine.

15. An anion exchange membrane having the anion exchanger as defined in claim 10, formed into a membrane.

16. The anion exchange membrane according to claim 15, which has an alternate current resistivity of from 50 to 6000 Ω·cm in a 0.5 mol/l sulfuric acid aqueous solution at 25° C.

17. A process for producing the anion exchange membrane as defined in claim 15, which comprises reacting a part of haloalkyl groups of an aromatic polysulfone homopolymer having a repeating unit of the formula 4, with a monoamine, forming the polymer into a membrane, and reacting the rest of haloalkyl groups with a polyamine.

18. An anion exchanger, comprising:

an aromatic polysulfone homopolymer having haloalkyl groups and having a repeating unit represented by the formula 4, reacted with an amine:

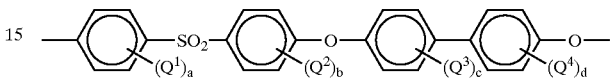

Formula 4 where in the formula 4, each of $Q^1$ and $Q^2$ which are the same as or different from each other, is a $C_{1-8}$ hydrocarbon group or a fluorine atom, and each of a and b is an integer of from 0 to 4, provided that a+b is from 0 to 8, each of $Q^3$ and $Q^4$ which are the same as or different from each other, is a $C_{1-8}$ hydrocarbon group or a fluorine atom, each of c and d is an integer of from 0 to 4, provided that c+d is from 0 to 7, and at least one hydrogen atom bonded to a phenylene group to which $Q^3$ or $Q^4$ can be bonded, is substituted by a haloalkyl group, wherein the ratio of the haloalkyl groups reacted with the amine is at least 30 mol % of all haloalkyl groups.

19. The anion exchanger according to claim 18, wherein the content of the haloalkyl groups in the aromatic polysulfone homopolymer is from 1.0 to 4.0 mmol/g.

20. The anion exchanger according to claim 18, which has an ion exchange capacity of from 0.5 to 4.0 meq/g dry resin.

21. The anion exchanger according to claim 18, wherein the amine is a monoamine.

22. An anion exchange membrane having the anion exchanger as defined in claim 18, formed into a membrane.

23. The anion exchange membrane according to claim 22, which has an alternate current resistivity of from 50 to 6000 Ω·cm in a 0.5 mol/l sulfuric acid aqueous solution at 25° C.

24. A process for producing the anion exchange membrane as defined in claim 22, which comprises reacting a part of haloalkyl groups of an aromatic polysulfone homopolymer having a repeating unit of the formula 4, with a monoamine, forming the polymer into a membrane, and reacting the rest of haloalkyl groups with a polyamine.

* * * * *